United States Patent [19]

Baumgarten et al.

[11] Patent Number: 5,433,382
[45] Date of Patent: Jul. 18, 1995

[54] WINDSHIELD CLEANING SYSTEM

[75] Inventors: Peter Baumgarten, Coburn; Reinhard Edele, Bietigheim-Bissingen; Bruno Egner-Walter, Heilbronn; Eckhardt Schmid, Brackenheim, all of Germany

[73] Assignee: SWF Auto-Electric GmbH, Germany

[21] Appl. No.: 788,657

[22] Filed: Nov. 6, 1991

Related U.S. Application Data

[62] Division of Ser. No. 490,797, Mar. 8, 1990, Pat. No. 5,074,471.

[30] Foreign Application Priority Data

Mar. 11, 1989 [DE] Germany ............... 39 07 980.5

[51] Int. Cl.$^6$ ............................................. B60S 1/46
[52] U.S. Cl. ............................................. 239/284.1
[58] Field of Search ............... 231/284.1, 284.2, 587, 231/588, 602, 533.13

[56] References Cited

U.S. PATENT DOCUMENTS

| 3,027,098 | 3/1962 | Helmer | 239/602 |
| 3,214,102 | 10/1965 | Meyer | 239/602 X |
| 3,361,161 | 1/1968 | Shwartz | 239/602 X |
| 3,827,101 | 8/1974 | Wubbe | 15/250.04 |
| 4,088,269 | 5/1978 | Schlick | 239/133 |
| 4,286,734 | 9/1981 | Tonge | 239/600 X |
| 4,350,298 | 9/1982 | Tada | 239/600 X |
| 4,736,893 | 4/1988 | Norskov | 239/600 X |

FOREIGN PATENT DOCUMENTS

| 1031661 | 4/1958 | Germany | 239/284.1 |
| 1800013 | 10/1968 | Germany | . |
| 2541093 | 9/1975 | Germany | 239/533.13 |
| 2082051 | 3/1982 | United Kingdom | 15/250.04 |
| 2119285 | 11/1983 | United Kingdom | 239/533.13 |

Primary Examiner—Andres Kashnikow
Assistant Examiner—Kevin Weldon
Attorney, Agent, or Firm—Robert P. Seitter; J. Gordon Lewis

[57] ABSTRACT

A windshield cleaning system with a spraying device is described, in which windshield cleaning system a jet element made of an elastic material is carried in an adjustable jet body formed in the shape of a ball. The jet element is formed with elastic lids forming a spraying mouth which is normally closed and which is located outside of the jet body. The spraying mouth is opened by the pressure of the washing liquid. With such an arrangement the direction of the spraying jet can be adjusted and the washing liquid is prevented from freezing due to the fact that the spraying mouth can be closed.

12 Claims, 4 Drawing Sheets

WINDSHIELD CLEANING SYSTEM

This is a divisional of application Ser. No. 07/490,797 filed on Mar. 8, 1990 now U.S. Pat. No. 5,074,471.

BACKGROUND OF THE INVENTION

The invention relates to a windshield cleaning system and more particularly to such a system useful in motor vehicles.

Normally a windshield cleaning system of a modern motor vehicle comprises a wiper system as well as a windshield washing system comprising a washing liquid reservoir as well as a pump by which washing liquid is sprayed onto the windshield to be cleaned via a spraying device. There are motor vehicles in which this spraying device is stationarily arranged in the engine compartment hood. In other windshield cleaning systems the spraying device is fixed to the wiper arm. The advantage of this latter system is that the washing liquid is sprayed immediately in front of the wiper blade.

Normally the spraying device of such a windshield washing system consists of a jet housing with a receiver into which a jet body, that is usually a ball-like body, is adjustably fixed. Due to the jet body's adjustability spraying devices of this kind can universally be used in motor vehicles of all sorts.

As to these windshield washing systems one problem is that operation is not always possible in low temperatures. This is because the washing liquid line from the reservoir to the jet body is not emptied so that the system's operation can be repeated quickly. Thus washing liquid remains in the bore of the jet body and can become frozen because at this extreme point the antifreeze easily evaporates.

SUMMARY OF THE INVENTION

The primary object of the present invention is to provide a windshield cleaning system arranged in such a way that by use of simple means all requirements noted above are obtained.

In accordance with this invention washing liquid can effectively be prevented from freezing, if the mouth, that is the aperture through which the washing liquid jet emerges, is closed after the washing process. This is preferably achieved by use of a jet element consisting of an elastic material fixed to the adjustable jet body so that a spraying device can still be used universally for different motor vehicles.

Jet elements made of elastic material have been known for years, but up to now they have been arranged stationarily and have not been fixed onto an adjustable jet body. With the combination of such a jet element and an adjustable jet body, an excellent washing effect is achieved at low costs because the adjustability of the jet body allows the spraying device to be used universally.

In a preferred embodiment this jet element has a pipe-like portion from which two lips project and form a slit-like mouth. This pipe-like portion is in the bore of the jet body and the movable lips close the mouth and extend from the jet body. As to such an embodiment comprising a jet element put into the usual bore of the jet body no additional elements are necessary for assembling this jet element. The lips prevent the whole spraying device from freezing and from being unable to function to a large extent because when the lips are opened any ice surrounding the lips is broken away by the pressure of the water. In contrast, the ice surrounding the lips could be prevented from breaking away, if the lips of the jet element are arranged within the bore of the jet body.

Other embodiments are possible, e.g., the jet element could be arranged totally outside the adjustable jet body and fixed especially onto its free front face. Such embodiments are useful as original equipment for a motor vehicle, but an essential advantage of this embodiment is that the spraying devices can be retrofitted into existing vehicles.

BRIEF DESCRIPTION OF THE DRAWING

The invention and its advantageous developments are explained by means of the embodiments illustrated in the drawing in which.

DETAILED DESCRIPTION

Figure 1:
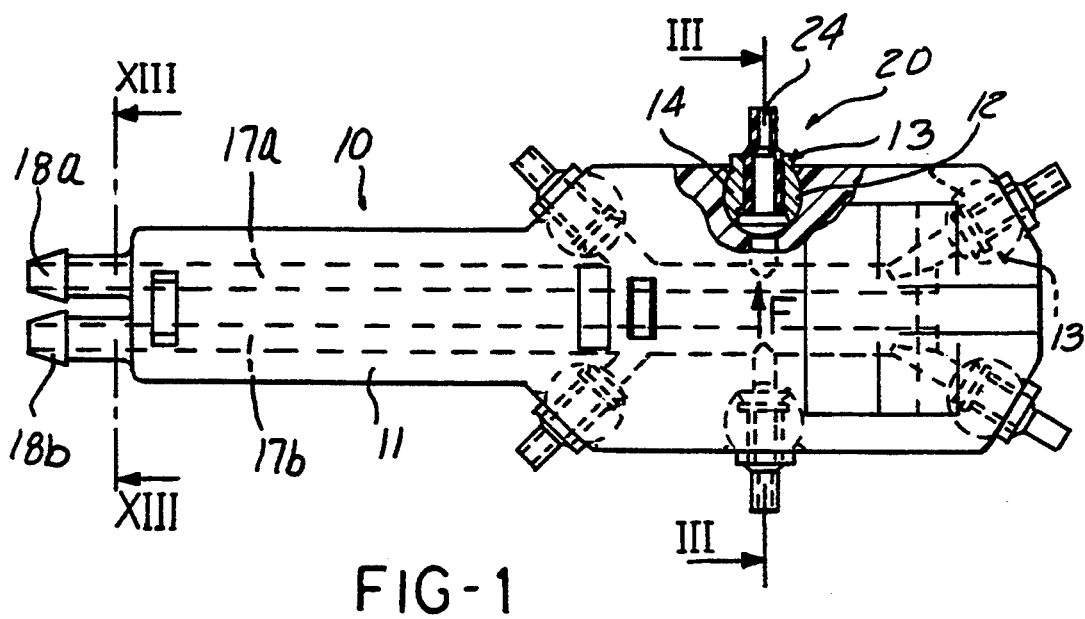
FIG. 1 is a top plan view of a jet housing.

In FIG. 1 the numeral 10 designates a spraying device comprising a jet housing 11 normally made of a plastic material. This jet housing, is formed with several ball-like receivers 12, each receiving one jet body 13. Each jet body 13 comprises a ball-like basic body 14 with a continuous bore 15 as well as a cylindrical projection 16. The jet housing 11 is provided with internal washing liquid channels 17a, 17b, via which washing liquid is fed from the hose connecting fitting 18a, 18b to the jet bodies 13 or the bores 15. The construction of such spraying devices described up to now is known so that no further explanations are needed. As to the known embodiments the washing liquid is sprayed immediately through the bore 15 of the jet body to the windshield to be cleaned.

A jet element 20 made, of an elastic material cooperates with the adjustable jet body 13. This jet element 20 has a pipe-like portion 21 and two lips 22, 23 extending therefrom and forming a slit-like mouth or aperture 24. On the end of the pipe-like portion 20 opposite these lips 22, 23 there is formed a radially extending bead or collar 25. The collar 25 supports the jet element 20 on the jet body 13. In the embodiment FIGS. 1 to 3 the pipe-like portion 21 is totally seated within the bore 15 in the jet body 13. To assemble, the jet element 20 is inserted into the bore 15 in feed or fluid flow direction, i.e. in the direction of Arrow F in FIG. 1, until the collar 25 bears against a ring flange 30 of the jet body 13. If, with respect to the diameter of the bore 15 in the jet body the pipe-like portion 21 of the jet element 20 is so dimensioned, this jet element can be held in the jet body 13 by a force fit only. Additionally or alternatively an adhesive connection is possible. In the embodiment illustrated in FIGS. 1 to 3, the collar 25 of the jet element 20 is buttoned or snapped into a ring-groove 31. This can be done without any difficulties because of the elastic material of the jet element 20. Forming this ring-groove 31 can be done easily especially if, instead of a surrounding strip 32 (as shown), only a few sections are punched out of the inner wall of the bore 15 in a metallic jet body 13.

Figure 3:
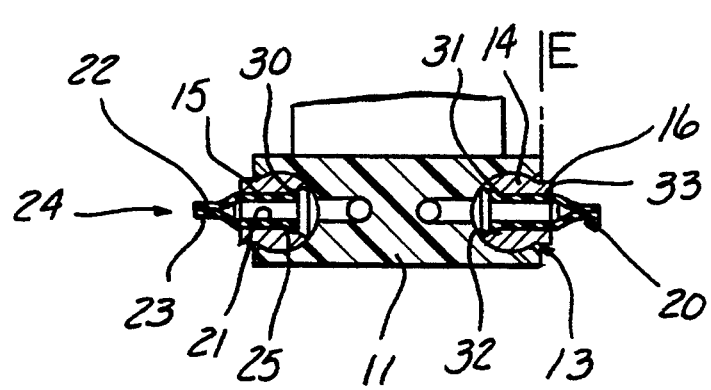
FIG. 3 is a section taken along the line III—III of FIG. 1.

Especially in FIG. 3 it can be seen that the length of this pipe-like portion 21 corresponds more or less to the axial extent of the jet body 13. Thus the transition from the pipe-like portion 21 to the lips 22, 23 of the jet element is in the plane E containing the front end face 33 of the cylindrical projection 16 of the jet body 13. Thus in contrast to the pipe-like portion 21, the lips 22, 23 are not within the bore 15, but extend beyond the front face 33 of the jet body 13.

FIG. 3 illustrates the jet element in the rest position, when the washing system is switched off. It can be seen that the mouth 24 is closed and so at this extreme point the danger of evaporation of the antifreeze is significantly reduced. This results from the fact that even in extremely low temperatures washing liquid is not likely to freeze within the pipe-like portion 21. On the other hand frozen washing liquid at the outside of the lips 22, 23 can be broken away upon initial operation of the washing system, when these lips 22, 23 are pressed towards the outside against their own elasticity by the pressure of the washing liquid and thus when the mouth 24 is opened. It is also noted that this jet element takes over the function of a valve because after the washing process the mouth or the aperture is immediately closed and thus the washing liquid cannot flow back into the reservoir. A short delay between the beginning of the washing process and the emergence of the washing liquid at the jet can be achieved without any additional valve.

Figure 2:
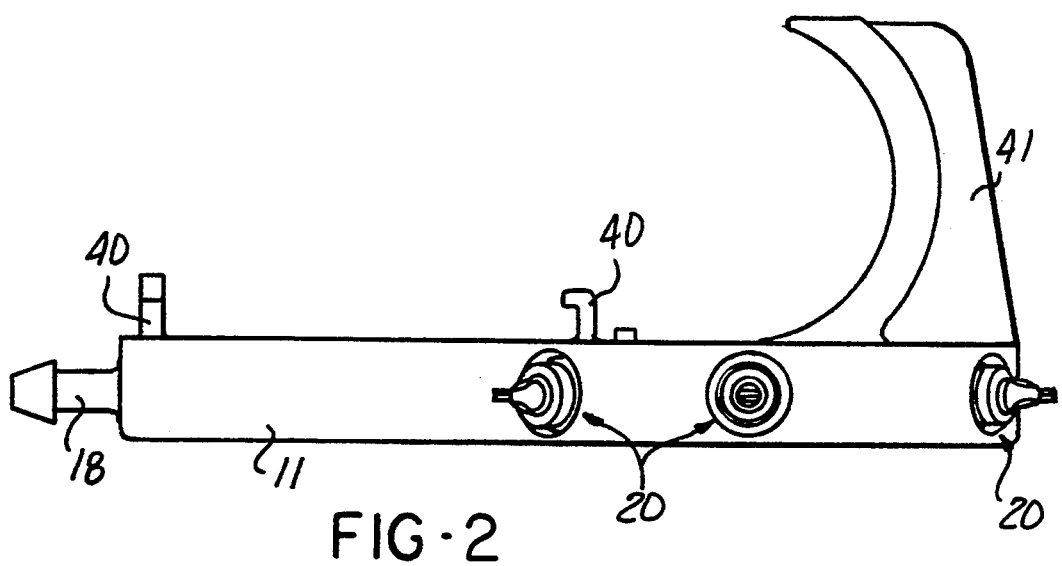
FIG. 2 is a side view of the jet housing shown in FIG. 1.

As to the embodiment according to the FIGS. 1 to 3 it is also noted that locking means 40 are preferably integrally formed onto the jet housing 11, via which locking means 40 the jet body 13 can immediately be locked at the wiper arm of the windshield cleaning system. In FIG. 2 a stud 41 in the shape of a U can be seen, which stud 41 is to be supported on the known wiper arms by means of its end bent in the form of a hook.

In the FIGS. 1 to 3 embodiment, the let housing 11 is provided with several adjustable jet bodies and jet elements which are additionally fed via two different washing liquid channels 17a, 17b. Thus it is to be ensured that each time washing liquid is only sprayed in wiping direction in front of the wiper blade.

Figure 4:
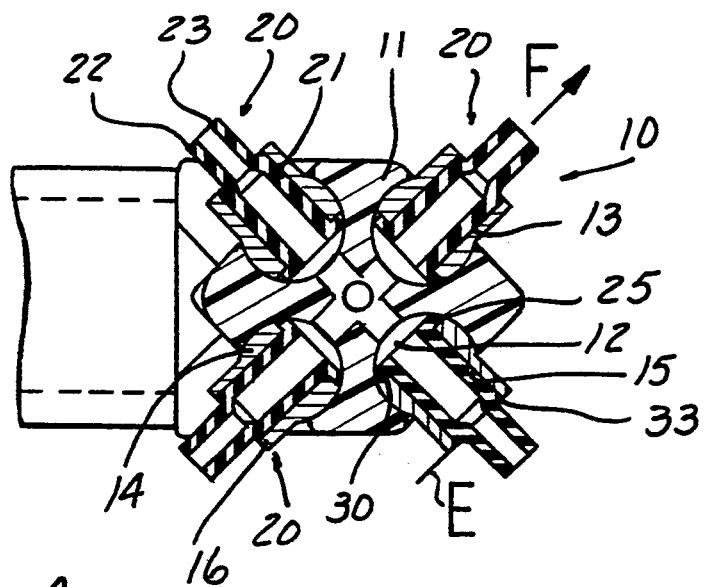
FIG. 4 is a view, partly in section of another embodiment of a jet housing.
Figure 5:
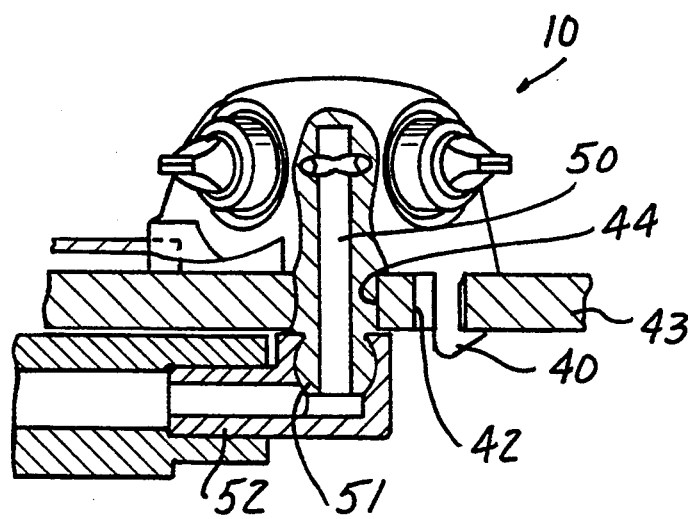
FIG. 5 is a section of the jet housing according to FIG. 4.
Figure 6:
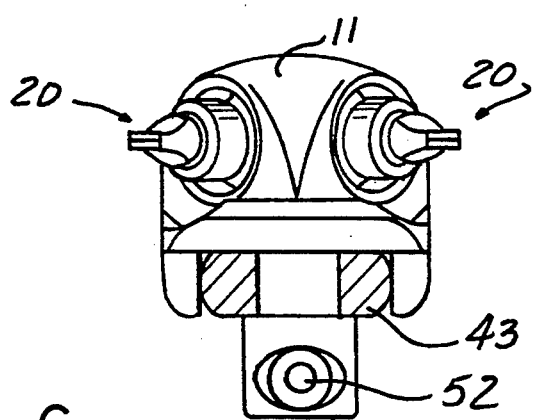
FIG. 6 is an end view of the jet housing of FIG. 5.

As to the embodiment according to the FIGS. 4 to 6 four jet elements 20 arranged in form of a cross are adjustably fixed in a jet housing 11. The jet elements 20 are similarly inserted into the jet body 13 in feed direction F, until the collar 25 lies on the ring flange 30. However, the jet elements 20 are held by force-fit or adhesion. It is not necessary to button or snap them into a ring-groove because the receiver 12 is shaped and dimensioned to prevent the jet element from moving relative to the jet body 13. Locking means in the form of several locking hooks 40 penetrating a bore 42 of a wiper arm 43 are formed on the jet housing. A channel portion 50 integrally formed with the jet housing 11 also penetrates a bore 44 of the wiper arm 43. At the free end of this channel portion 50 there is a ball-like locking body 51 onto which an angularly formed hose connecting fitting 52 can be coupled as a separate part. When this hose connecting sitting 52 has been coupled onto the channel portion 50, the spraying device 10 is fixed onto the wiper arm 43 or onto another part of the car body in a stable way.

Figure 7:
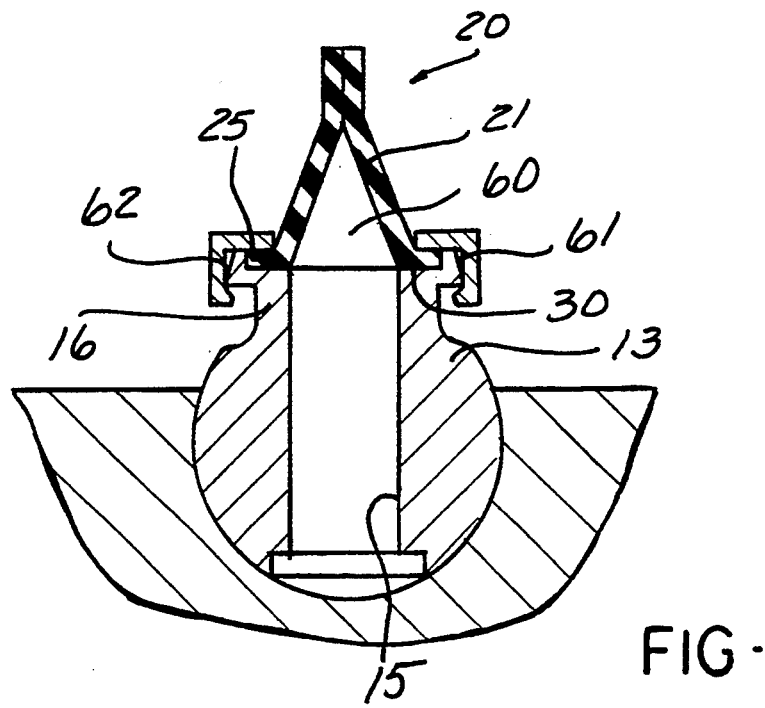
FIG. 7 is a sectional view of another embodiment of a jet body with a jet element.
Figure 8:
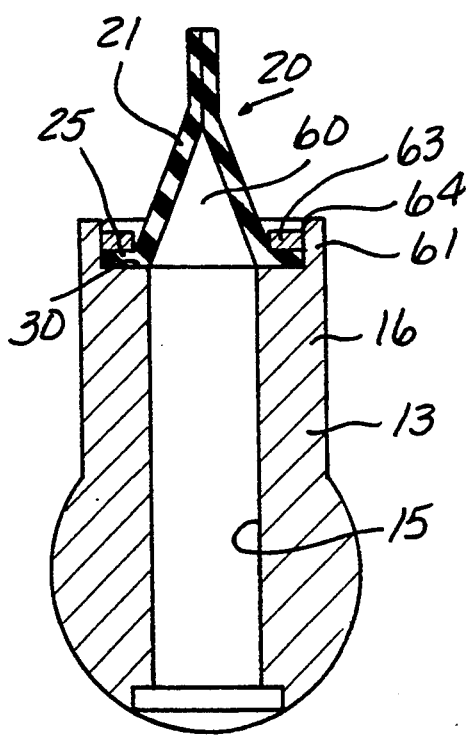
FIG. 8 is a sectional view of a further embodiment.
Figure 9:
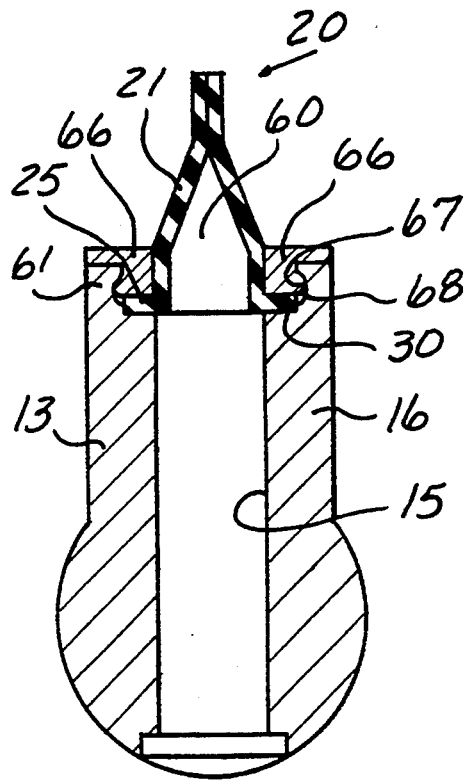
FIG. 9 is a sectional view of a still further embodiment.

As to the embodiments according to the FIGS. 7 to 9 the jet element 20 is fixed onto the free front face of the jet body 13. Thus the pipe-like portion 21 is conically formed in these embodiments and is not seated within the bore 15 of the jet body 13. The embodiments according to the FIGS. 7 to 9 differ from each other with respect to the way the elastic jet element 20 is fixed in the jet body 13. In these embodiments the collar 25 is seated in an enlarged cylindrical opening referred to hereinafter as a pot-shaped receiver 60 of the cylindrical projection 16 of the jet body 13. The collar 25 bears on an annular surface or a ring flange 30 forming the bottom of this pot-shaped receiver 60. In radial direction the jet element 20 is fixed by means of the cylindrical side wall 61 of the receiver 60. In the embodiment according to FIG. 7 an elastic ring clamp 62 is provided as an additional holding element, which ring clamp 62 acts upon the collar 25 of the jet element 20 and grips the outside of the pot-shaped receiver 60. Thus the jet element on the ring flange of the jet body is axially tensioned so that an absolute sealing is ensured. An absolute sealing is also achieved with respect to the embodiment according to FIG. 8 in which a band 63 is put onto the collar 25. The band 63 is pressed against the collar 25 by locking projections 64 which are punched out of the side wall 61 of the pot-shaped receiver.

FIG. 9 principally differs from the embodiment according to FIG. 8 in that the locking projections 64 and the band 63 are replaced by a lock ring 66 which is locked at the inside of the side wall 61 of the pot-shaped receiver 60. For this purpose the lock ring 66 comprises radially projecting locking projections 67 engaging locking receivers 68 formed on the side wall 61 of the pot-shaped receiver 60.

As to all the embodiments described so far it is of importance that the surrounding collar is supported on a corresponding ring flange at the jet body. Thus an absolute sealing between the bore in the jet body and the jet element can be achieved.

Figure 11:
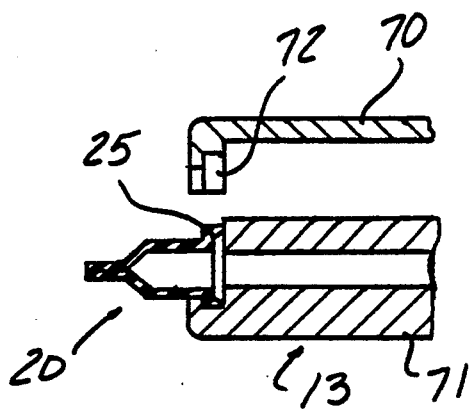
FIG. 11 is a partial longitudinal section of FIG. 10 with a jet element inserted in the jet body; and, FIG. 12 is an enlarged detail of circled section Z of FIG. 10.
Figure 10:
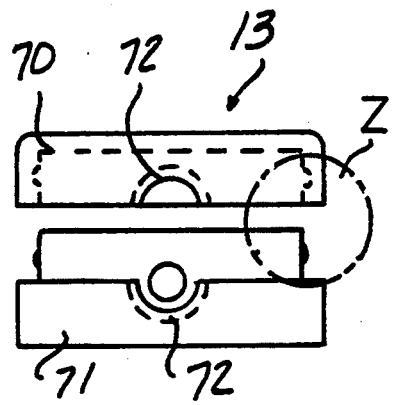
FIG. 10 is a front view of a two-part jet body.
Figure 12:
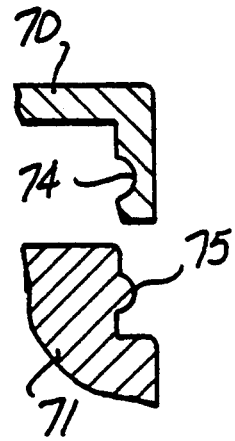
Figure 13:
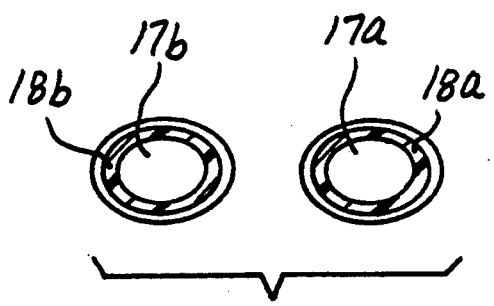
FIG. 13 is an enlarged detail taken along the cross-section line XIII—XIII of FIG. 1.

As to the embodiment according to the FIGS. 10 to 12, the jet body 13 is formed of two parts 70, 71. Each of the parts 70, 71 includes a partial area of a ring-groove 72. The collar 25 of the jet element 20 is held in the ring groove 72 when the parts 70, 71 are assembled. Such an embodiment can easily be assembled because this collar 25 is not supported at an integral ring flange. The two parts 70 and 71 are locked together by locking receivers 74 formed on one part and locking projections 75 formed on the other part.

Finally it is pointed out that in order to obtain a low construction height, the cross-section of the hose connecting fitting, for instance, the hose connecting fitting 18a, 18b in FIG. 1 can be elliptically formed, whereby the larger main axis runs in a direction parallel to the wiper rod. Such an embodiment is an advantage also, when used with respect to the usual jet body having no elastic jet element.

What is claimed is:

1. A windshield cleaning system for motor vehicles including a spraying device for a washing liquid, the spraying device comprising:
   a jet housing with at least one receiver;
   a jet body adjustably received in the receiver, the jet body having a continuous bore to which washing liquid can be fed through a channel formed within the jet housing, the jet body having a ball-like body formed with a cylindrical projection, the cylindrical projection having a pot shaped receiver adjacent a free end thereof; and
   a jet element made of elastic material, the jet element being fixed to the adjustable jet body and having an elastic mouth which is normally closed and which can be opened by the pressure of washing liquid, wherein the jet element includes a pipe-like portion and two lips extending therefrom and forming a slot, wherein the lips are elastically tensioned against each other to close the slot and the lips extend from the jet body, wherein the jet element is formed with a collar on an end opposite from the lips extending radially from the pipe-like portion and wherein the collar is fixed to the pot-shaped receiver formed in the jet body, the collar being supported on the jet body in a pressure-sealed way.

2. A windshield cleaning system according to claim 1, wherein the jet element is held by an elastic ring clamp gripping the outer surface of the side wall of the pot-shaped receiver.

3. A windshield cleaning system according to claim 1, wherein locking projections extend radially inwardly from the sidewall of the pot-shaped receiver, the locking projections acting upon an elastic ring clamp to hold the collar of the jet element.

4. A windshield cleaning system according to claim 1, wherein a locking ring is located in the pot-shaped receiver, the locking ring having locking projections engaging a locking receiver formed in the side wall of the pot-shaped receiver.

5. A windshield cleaning system for motor vehicles including a spraying device for a washing liquid, the liquid spraying device comprising:
   a jet housing with at least one receiver;
   a jet body adjustably received in the receiver, the jet body having a ball-like configuration with a cylindrical projection and a continuous bore to which washing fluid can be fed through a channel formed within the jet housing, wherein the jet body is constructed of two parts which can be locked together forming a ring-groove adjacent a free end of the cylindrical projection; and
   a jet element made of elastic material, the jet element being fixed to the adjustable jet body and having an elastic mouth which is normally closed and which can be opened by the pressure of washing liquid, wherein the jet element includes a pipe-like portion and two lips extending therefrom and forming a slot, wherein the jet element is formed with a collar on an end opposite from the lips extending radially from the pipe-like portion, and wherein the jet element is fixed onto a free front face of the jet body when the jet body is locked together to hold the collar in the ring-groove.

6. A windshield cleaning system for motor vehicles including a spraying device for a washing liquid, the liquid spraying device comprising:
   a jet housing with at least one receiver, wherein the jet housing includes two washing liquid channels each of which leads to a hose connecting fitting;
   a jet body adjustably received in the receiver, the jet body having a continuous bore to which washing fluid can be fed through one of said channels formed within the jet housing; and
   a jet element made of elastic material, the jet element being fixed to the adjustable jet body and having an elastic mouth which is normally closed and which can be opened by the pressure of washing liquid, wherein the jet element includes a pipe-like portion and two lips extending therefrom and forming a slot, and wherein the jet element is fixed onto the free front face of the jet body.

7. A windshield cleaning system for motor vehicles including a spraying device for a washing liquid, the liquid spraying device comprising:
   a jet housing with a plurality of receivers;
   a plurality of jet bodies adjustably received in corresponding receivers, each jet body having a continuous bore to which washing fluid can be fed through a channel formed within the jet housing, wherein each jet body is constructed of two parts which can be locked together and which form a ring-groove adjacent a free front face of the jet body when in a locked together position;
   a plurality of jet elements made of elastic material, each jet element being fixed to a corresponding adjustable jet body and having an elastic mouth which is normally closed and which can be opened by the pressure of washing liquid, wherein each jet element includes a pipe-like portion and two lips extending therefrom and forming a slot, and wherein each jet element on an end opposite the lips includes a collar extending radially from the pipe-like portion, wherein each collar is fixed in the ring-groove formed adjacent the free front face of the corresponding jet body in a pressure-sealed way, wherein each jet body is locked together to hold the collar of the corresponding jet element in the ring-groove;
   a hose connecting fitting on the jet housing of a non-circular cross-section; and
   locking means on the jet housing for locking the jet housing to a part of a motor vehicle, wherein the locking means includes locking hooks and wherein the locking hooks extend from the jet housing to engage a part of the wiper arm.

8. A windshield cleaning system for motor vehicles including a spraying device for a washing liquid, the liquid spraying device comprising:
   a jet housing with at least one receiver, wherein the jet housing includes locking means for locking the jet housing to a part of a motor vehicle, the locking means including locking hooks extending from the jet housing to engage a part of a wiper arm;
   a jet body adjustably received in the receiver, the jet body having a continuous bore to which washing fluid can be fed through a channel formed within the jet housing;
   a jet element made of elastic material, the jet element being fixed to the adjustable jet body and having an elastic mouth which is normally closed and which can be opened by the pressure of washing liquid, wherein the jet element includes a pipe-like portion and two lips extending therefrom and forming a slot, and wherein the jet element is fixed onto the free front face of the jet body;

a ball-like locking body formed on the jet housing with a bore in communication with said continuous bore of said jet body; and a hose connecting fitting carried on the ball-like locking body.

9. A windshield cleaning system for motor vehicles comprising a spraying device for a washing liquid, the spraying device comprising a jet housing with at least one receiver, a jet body adjustably received in the receiver, the jet body having a continuous bore to which washing liquid can be fed through a channel formed within the jet housing, a jet element made of elastic material including a pipe-like portion and two lips extending therefrom and forming a slot, the jet element being fixed to the free front face of the adjustable jet body and having an elastic mouth which is normally closed and which can be opened by the pressure of washing liquid, said spraying device further defining locking means engagable with a wipe arm of a windshield wiper system of said motor vehicle for reciprocating displacement therewith said jet housing including two separate washing liquid channel systems each of which leads to a hose connecting fitting, each system in fluid communication with at least one jet body for alternately dispensing fluid in opposed directions fields.

10. The windshield cleaning system according to claim 9, wherein said locking means comprises a system of tabs integrally formed with said jet housing for engagement with mating surfaces on said wiper arm.

11. The windshield cleaning system according to claim 9, wherein said device comprises a plurality of adjustable jet bodies arranged to dispense washing liquid in substantially opposite directions.

12. The windshield cleaning system according to claim 11, wherein said device comprises at least four adjustable jet body arrayed to dispense washing fluid substantially omnidirectionally.

* * * * *